Sept. 11, 1923.  J. R. GANNON  1,467,976
DISAPPEARING VEHICLE STEP
Filed Sept. 15, 1922
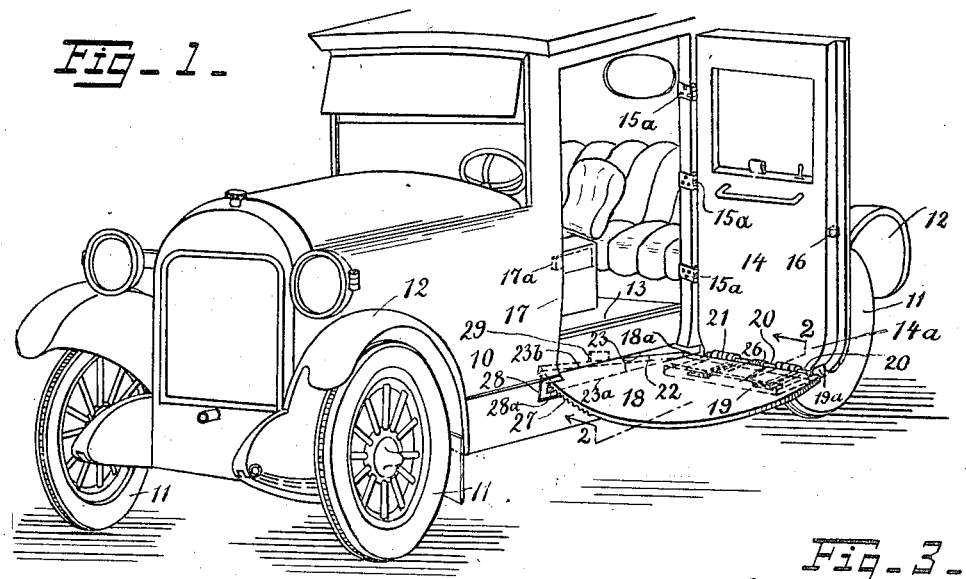
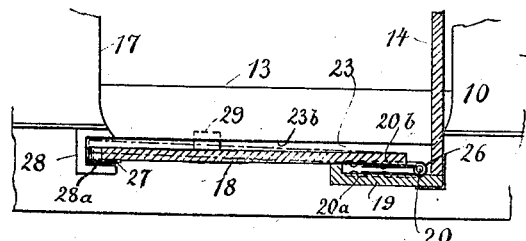
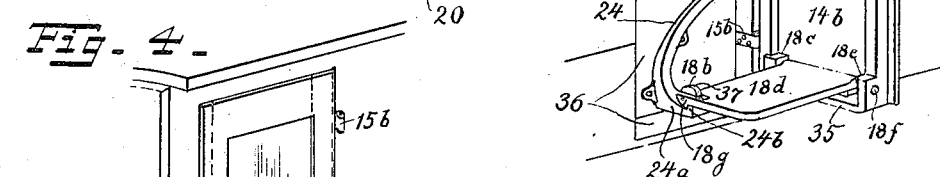
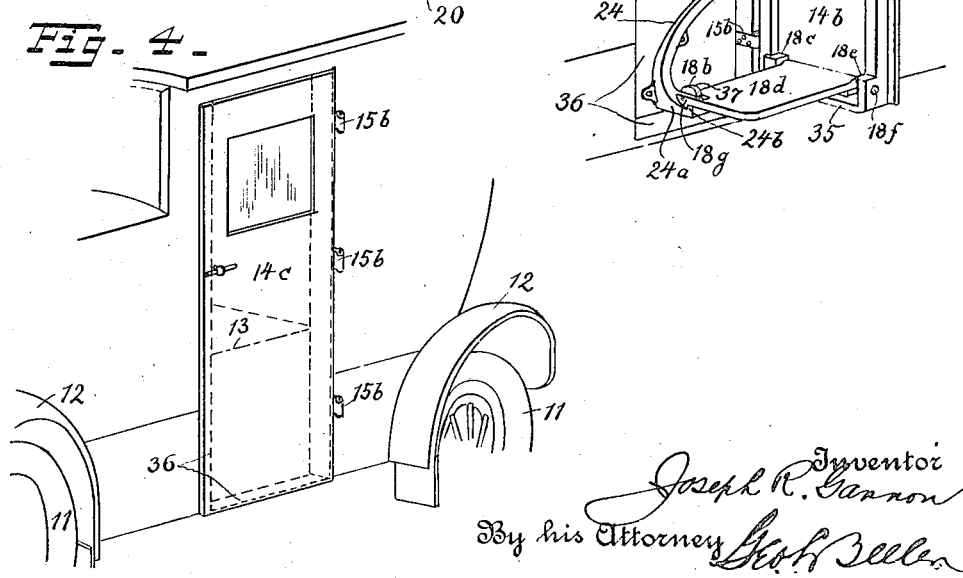

Patented Sept. 11, 1923.

1,467,976

UNITED STATES PATENT OFFICE.

JOSEPH R. GANNON, OF NEW YORK, N. Y.

DISAPPEARING VEHICLE STEP.

Application filed September 15, 1922. Serial No. 588,329.

*To all whom it may concern:*

Be it known that I, JOSEPH R. GANNON, a citizen of the United States, residing at New York city, borough of Manhattan, in the county of New York and State of New York, have invented certain new and useful Improvements in Disappearing Vehicle Steps, of which the following is a specification.

This invention relates to improvements in automobile accessories of the class that refers to the body or coach, and relates especially to improvements in means of ascending or stepping into or out of the car. The scope of the invention is however not confined to automobiles or even power driven cars though its application is in the first place intended for this class of vehicles where it is proposed to form a substitute for and an improvement over the usual running board, but its nature and construction is such that it may with equal facility and advantage be applied to any kind of passenger vehicles provided with swinging doors and requiring an extra step between the street level and the bottom of the car, as for instance horse driven coaches, cabs, phaetons, railway coupes with side entrances, such as are used in Europe and many southern countries. Even for such distant purposes as for the gondolas of a Ferris wheel, it could be used with propriety.

The principal object of the invention is to provide a disappearing step between the street level and the car floor which automatically swings into place when the door is opened, and automatically returns into the recess or hiding place provided for it when the door is closed.

Another object of the invention is to obviate by the use of this contrivance the necessity of providing unsightly running boards or protruding stationary door steps, and to enable the machine to be built with narrower mud guards than usual.

Another object is to safeguard the disappearing step against any spontaneous motion or displacement while it is being used by the passenger entering the car.

A further object of the invention is to attain said functions and by the simplest, safest, and least expensive constructions. These subservient objects will become apparent from the description.

These various objects are attained by the combination of parts hereinafter described in detail, reference being had to the accompanying drawings forming a part of this specification in which—

Figure 1 is a perspective view showing the complete construction in an operative position.

Fig. 2 is a view taken on the line 2—2 of Fig. 1, showing the step and its accessories in section.

Fig. 3 illustrates a modification of the invention.

Fig. 4 is a perspective view of the door shown in Fig. 3 when it is closed.

Referring now to the drawings in detail 10 designates the coach part of the body of an automobile, as for instance that of a so called coupe. Underneath it, parts of the chassis are shown, in particular the wheels 11, and the mud guards 12. 13 indicates the car floor, 14 one of the doors swinging on the hinges 15$^a$ and 15$^b$. When the door is locked, the door latch 16 engages with the latch recess 17$^a$, shown dotted in the door jamb 17. The lower part 14$^a$ of the door either in solid or skeleton form, extends below the level of the car floor and is provided with an inner horizontal ledge 19, on which is hinged the step 18 by means of the pivot 20, joining the hinges 21$^a$ fastened on the ledge, to the hinges 21$^b$, forming a part of the step 18. (See Fig. 2.) The step may be otherwise connected to the door. This step has a segmental form, comprising a quarter of a circular disk or more, with its center 18$^a$ being located perpendicularly underneath the door hinges. One of its radial edges 21 forms its hinge side, while the other radial edge 22 fits with suitable clearance into the slot 23 provided in the chassis body underneath the car floor.

Around the hinge pivot 20 is provided a weak coil spring 26 the ends of which bear against the underside of the step and the upper edge of the door ledge in such a way that it imparts to the step a constant tendency to swing upward on the pivot 20. The strength of the spring must however not be excessive, but preferably only sufficient to lift the step, when the door is swung open, without friction over the lower edge 23$^a$ of the slot 23 without even bringing the upper edge 23$^b$ into much contact if any with the step. The under side of the step on the circular periphery is provided for a certain distance, beginning at the slot edge 22, with corrugations or teeth-like projections 27, and at the foot of the door jamb 17 is fastened in a suitable way an angular bracket 28 which may also be integral with the jamb, at such level, that when the step with its teeth-like projections rests on it as a result of the weight naturally added to the step, the step assumes a horizontal position and forms a convenient platform for its intended purpose. The horizontal arm of the rectangular bracket is provided on top also with corrugations or at least a roughened surface $28^a$ so that when any live weight rests on the swung-out step, the corrugations of the step and the bracket will firmly interlock with each other and prevent a spontaneous closing or even displacement of the door and the step attached to it. As soon as the weight is removed, however, viz., when the person alights from the step to the street or has entered the car, the resiliency of the spring releases the frictional interlocking of the teeth or corrugations, and the step can easily be swung back into the slot, when the door is closed, without engagement anywhere in the slot 23. The bracket furthermore provides a substantial support for the otherwise free or unsupported edge of the step.

To safeguard the platform against being swung out too far, when it would disengage entirely from the slot 23 and thus would be difficult or inconvenient to be swung back into the same, it must be provided on the slot edge 22 with a bent over ledge or at least a short stop 29, fastened to the edge from the inside of the slotted chassis frame. When the door is closed, the step disappears entirely within or below the chassis frame, the slot being cut wide enough to receive the door ledge 19, which on the outer end $19^a$ is cut short so that it would not interfere with the bracket 28.

Thus it will be seen that by this construction and arrangement of parts all the objects mentioned are met with and attained.

As shown in Figs. 3 and 4, the construction differs from the one described only in the manner in which the disappearing step is disposed of or controlled, and which may be preferable in such cases where the construction of the chassis provides a variation in the room or no clearance for the step underneath the car floor. In this case the slot 23 may be dispensed with and therewith disappears the upper guidance formed by the upper edge $23^b$, and holding eventually the stepping platform at an approximately horizontal level; the spring 26 likewise can be dispensed with and the weight of the platform $18^d$ itself is depended upon to bring it down to a level position where it is received upon the bracket $24^a$, which is part of the cam 24. The door $14^c$ on its lower part $14^b$ is recessed and the ledge 35 must be so shaped that it forms no obstruction when the door is closed. Around the pivot $18^f$, journaled in the upturned extreme ends $18^c$ and $18^e$ of the ledge 35 the platform $18^d$ is folded or otherwise rotatably fastened. The step folds backward and upward into the recess of the closed door, and the supporting frame of the car floor, must be also recessed as shown at 36, that sufficient room is provided for the upturned step $18^d$, when the door is shut. In this recessed space is securely fastened a cam 24, laid out in such manner that an idler 37, provided at the inner swinging corner $18^g$ of the folding platform, will travel on it while the door is being closed, forcing the platform upward. The cam on its lower portion $24^a$ projects slightly forward, forming an easy ascent for the roller. The lowest and most projecting extremity is shaped as a ledge $24^b$, forming a stop for the hook shaped corner $18^g$ of the platform. This stop is the substitute for the formerly described stop 29. The cam like surface is curved or directed upward from this point in such a manner that while the door is being closed it forces the step to fold upward toward the door, so that it is in a substantially vertical position when the door is locked shut.

It also apparent that in this modified arrangement the teeth or corrugations on the underside of the platform as well as on the bracket extension 39 become superfluous and are therefore omitted. The working method and function of the last decribed device is analogous to the first one with this difference that the disappearing step folds upward against the inner side of the door instead of swinging into the chassis underneath the car floor. The foregoing description is believed sufficiently clear to enable those versed in the art to make and use the device described, but it is understood that the invention admits of other modifications without deviating from the main principles of the invention.

I claim:

1. The combination with a vehicle body including a door arranged to swing around a vertical axis, the body having a slot adjacent to the door and beneath the plane of the floor of the body, of a platform attached along one edge directly to the bottom portion of the door and movable horizontally through said slot while the door is swinging on its axis, and locking means between the platform and the walls of the slot for holding the platform and door stationary while the platform is occupied.

2. Mechanism as set forth in claim 1 in which the locking means consists of interengaging teeth formed on the bottom of the platform and a portion of the slot structure, the platform being movable under the weight of a person downward for such automatic locking.

3. Mechanism as set forth in claim 1 in which there is provided a bracket at the end of the slot remote from the open door, said bracket embracing the otherwise free edge of the platform for stiffening the same when occupied by a person.

4. The combination with a vehicle body including a door movable around a vertical axis, of a platform of segmental form hinged along one straight edge to the lower portion of the door and movable downward around its hinge under the weight of a person on the platform, means acting automatically upon the platform tending to lift it upward after the person passes thereover, and relatively stationary means carried by the body adjacent to and co-operating with the otherwise free edge of the platform remote from the open door for stiffening the platform and holding it and the door stationary when a person is standing on or passing over the platform.

5. A disappearing step on a vehicle, comprising a segmentally shaped platform, attached to a swing door, forming a part of the vehicle body, in such a way that it swings around the same axis and in the same direction as the swing door, simultaneously and automatically with the door, means to guide said platform, and stopping means to fixedly hold the door and the platform at a given point.

In testimony whereof I affix my signature.

JOSEPH R. GANNON.